United States Patent
Yamakawa

(10) Patent No.: US 8,474,496 B2
(45) Date of Patent: Jul. 2, 2013

(54) PNEUMATIC TIRE WITH TREAD HAVING CUTAWAY PORTIONS FORMED IN CENTER RIB

(75) Inventor: Takahiro Yamakawa, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 737 days.

(21) Appl. No.: 12/451,195

(22) PCT Filed: Jun. 9, 2008

(86) PCT No.: PCT/JP2008/060521
§ 371 (c)(1),
(2), (4) Date: Oct. 29, 2009

(87) PCT Pub. No.: WO2008/152996
PCT Pub. Date: Dec. 18, 2008

(65) Prior Publication Data
US 2010/0116392 A1 May 13, 2010

(30) Foreign Application Priority Data
Jun. 12, 2007 (JP) .................................. 2007-154989

(51) Int. Cl.
*B60C 11/03* (2006.01)
*B60C 11/12* (2006.01)
(52) U.S. Cl.
USPC ............ 152/209.15; 152/209.21; 152/209.28; 152/DIG. 3
(58) Field of Classification Search
USPC ............... 152/209.2, 209.15, 209.18, 209.21, 152/209.24, 209.28, DIG. 3
See application file for complete search history.

(56) References Cited

U.S. PATENT DOCUMENTS

| 5,109,903 A | 5/1992 | Watanabe et al. |
| 5,885,384 A | 3/1999 | Himuro |

(Continued)

FOREIGN PATENT DOCUMENTS

| FR | 2703002 A1 | 9/1994 |
| GB | 460338 A * | 1/1937 |

(Continued)

OTHER PUBLICATIONS

Machine translation for Japan 2007-050738 (no date).*

(Continued)

*Primary Examiner* — Steven D Maki
(74) *Attorney, Agent, or Firm* — Carrier Blackman & Associates, P.C.; Joseph P. Carrier; William D. Blackman

(57) ABSTRACT

A pneumatic tire includes a pair of first circumferential main grooves formed in the center region of a tread, a pair of second circumferential main grooves formed respectively outward of the corresponding first main grooves, a plurality of first lug grooves which each extend from one of the two shoulder ends of the tread inward in the tire-width direction and communicate with the corresponding first main groove, a plurality of second lug grooves alternately arranged in the tire circumferential direction which each extend from one of the two shoulder ends of the tread inward in the tire-width direction but do not communicate with the corresponding first main groove, a center rib defined between the pair of first main grooves and extends continuously in the tire circumferential direction, a shoulder block row defined between each of the second main grooves and a corresponding one of the shoulder ends and includes a plurality of blocks, and an intermediate block row defined between each of the first main grooves and a corresponding one of the second main grooves. Each intermediate block row includes long blocks each of which has a tire-circumferential-direction length equivalent to the total length of each two blocks included in the corresponding shoulder block row.

9 Claims, 3 Drawing Sheets

U.S. PATENT DOCUMENTS

| | | |
|---|---|---|
| 6,427,737 B1 | 8/2002 | Katayama |
| 6,554,034 B1 | 4/2003 | Minami |
| 6,571,844 B1 | 6/2003 | Ochi et al. |
| 7,032,635 B2 | 4/2006 | Hashimoto et al. |
| 7,416,004 B2 | 8/2008 | Koya |
| 2002/0005238 A1* | 1/2002 | Boiocchi et al. ............... 152/903 |
| 2002/0144762 A1* | 10/2002 | Peda et al. ............... 152/209.15 |
| 2004/0238092 A1* | 12/2004 | Colombo et al. ........ 152/209.15 |
| 2004/0256041 A1* | 12/2004 | Ratliff, Jr. ................. 152/DIG. 3 |
| 2006/0086445 A1 | 4/2006 | Kishida |
| 2009/0078351 A1 | 3/2009 | Ebiko |
| 2010/0116392 A1 | 5/2010 | Yamakawa |
| 2011/0162770 A1 | 7/2011 | Yamakawa |

FOREIGN PATENT DOCUMENTS

| | | | |
|---|---|---|---|
| GB | 2017597 A | | 10/1979 |
| GB | 2093777 A | | 9/1982 |
| GB | 2376217 A | * | 12/2002 |
| JP | 62-251206 A | | 11/1987 |
| JP | 2-270609 A | | 11/1990 |
| JP | 5-229311 A | | 9/1993 |
| JP | 8-216623 A | | 8/1996 |
| JP | 09-020108 A | * | 1/1997 |
| JP | 9-328003 A | | 12/1997 |
| JP | 10-16514 A | | 1/1998 |
| JP | 11-115418 A | | 4/1999 |
| JP | 11-310013 A | * | 11/1999 |
| JP | 2001-039126 A | | 2/2001 |
| JP | 2001-213121 A | | 8/2001 |
| JP | 2001-213122 A | | 8/2001 |
| JP | 2002-192917 A | | 7/2002 |
| JP | 2002-240513 A | * | 8/2002 |
| JP | 2003-211921 A | | 7/2003 |
| JP | 2003-237320 A | | 8/2003 |
| JP | 2005-349970 A | | 12/2005 |
| JP | 2006-103464 A | | 4/2006 |
| JP | 2006-298055 A | | 11/2006 |
| JP | 2007-050738 A | * | 3/2007 |
| JP | 2007-062690 | | 3/2007 |

OTHER PUBLICATIONS

Machine translation for Japan 2002-240513 (no date).*
Machine translation for Japan 11-310013 (no date).*
Machine translation for Japan 09-020108 (no date).*

* cited by examiner

PNEUMATIC TIRE WITH TREAD HAVING CUTAWAY PORTIONS FORMED IN CENTER RIB

CROSS-REFERENCE TO RELATED APPLICATIONS

The present application is a U.S. National phase of, and claims priority based on PCT/JP2008/060521, filed 09 June 2008, which, in turn, claims priority from Japanese patent application 2007-154989, filed 12 June 2007. The entire disclosure of each of the referenced priority documents is incorporated herein by reference.

TECHNICAL FIELD

The invention relates to a pneumatic tire used suitably as a winter tire. More specifically, the invention relates to a pneumatic tire capable of achieving both good on-ice performance and good wet performance.

BACKGROUND ART

A tread pattern employed for many conventional winter tires, such as studless tires, is a block pattern with plural sipes formed in each block so as to extend in the tire-width direction (see, for example, Patent Document 1).

Decreasing the ratio of groove area thereby increasing the contact area is an effective method of improving on-ice performance of the tire of the above-mentioned type. There is, however, a problem that simply reducing the ratio of groove area may impair the drain function and thereby lower the wet performance. To put it differently, there is usually a trade-off relationship between good on-ice performance and good wet performance.

Patent Document 1: Japanese patent application Kokai publication No. 2005-349970

DISCLOSURE OF THE INVENTION

Problems to be Solved by the Invention

An object of the invention is to provide a pneumatic tire capable of achieving both good on-ice performance and good wet performance.

Means for Solving the Problems

Provided is a pneumatic tire capable of achieving both good on-ice performance and good wet performance. In the provided pneumatic tire, a pair of first main grooves are formed in the center region of a tread, and each first main groove extends in the tire circumferential direction. A pair of second main grooves are formed respectively outward of the corresponding first main grooves, and each second main groove extends in the tire circumferential direction. A plurality of first lug grooves and a plurality of second lug grooves are alternately arranged in the tire circumferential direction. The first lug grooves each extend from one of the two shoulder ends of the tread inward in the tire-width direction and communicate with the corresponding first main groove. The second lug grooves each extend from one of the two shoulder ends of the tread inward in the tire-width direction but do not communicate with the corresponding first main groove. A center rib is defined between the pair of first main grooves and extends continuously in the tire circumferential direction. A shoulder block row is defined between each of the second main grooves and a corresponding one of the shoulder ends and includes a plurality of blocks. An intermediate block row is defined between each of the first main grooves and a corresponding one of the second main grooves and includes a plurality of blocks. Each intermediate block row includes long blocks each of which has a tire-circumferential-direction length equivalent to the total length of each two blocks included in the corresponding shoulder block row.

Effects of the Invention

In the tread pattern employed for the pneumatic tire of the invention, the center rib is arranged in the center region of the tread, the shoulder block rows are arranged respectively in the shoulder regions of the tread, and each intermediate block row including the long blocks is arranged between the center rib and the corresponding shoulder block row. As a result, the ratio of groove area increases gradually from the center region of the tread to each shoulder end. Accordingly, the center region of the tread has a large contact area, so that the pneumatic tire achieves an improvement in the on-ice performance. In addition, the first lug grooves are communicatively connected to the corresponding first main groove formed in the center region and result in a relatively large ratio of groove area in the shoulder regions. Accordingly, the pneumatic tire can secure sufficient drain function and thereby can achieve excellent wet performance. Consequently, the pneumatic tire can achieve both good on-ice performance and good wet performance.

According to the invention, it is preferable that each intermediate block row should include: the plurality of long blocks each of which has a tire-circumferential-direction length equivalent to the total length of each two blocks included in the corresponding shoulder block row; and blocks which are arranged at the same pitch as the pitch for the plurality of blocks included in the corresponding shoulder block row. In addition, it is preferable that the tread should have a ratio of groove area of 25% to 40%, within a tire contact width. Moreover, it is preferable that the center rib should have a width of 5% to 25% of the tire contact width. Accordingly, the pneumatic tire can achieve both good on-ice performance and good wet performance. Note that the tire contact width is a contact width in the tire-axis direction measured when the tire is inflated with a air pressure corresponding to the maximum loading capacity in a correspondence table of inflation pressure and load capacity defined in the JATMA year book (an edition of Year 2006), and a load of 80% of the maximum loading capacity is applied to the tire.

It is preferable that a plurality of sipes each of which extends in the tire-width direction should be formed in the center rib, in each block of the intermediate block rows, and in each block of the shoulder block rows. The plurality of sipes formed in the center rib should be arranged in the tire circumferential direction at smaller intervals than the intervals at which the sipes formed in any of the intermediate block rows and the shoulder block rows are arranged in the tire circumferential direction. The center rib is less likely to fall down than block rows at the time of braking and at the time of driving. Accordingly, the sipes formed in the center rib are selected to narrow the tire-circumferential-direction intervals, so that the pneumatic tire can achieve an improvement in the on-ice braking performance.

It is preferable that a plurality of cutaway portions should be formed in the center rib at certain intervals in the tire circumferential direction. Each cutaway portion should have a triangular shape formed on a tread surface of the center rib and having an apex and a pair of end points all of which are connected to one another. In addition, each cutaway portion should have a three-dimensional structure such that a valley line is formed by a first contour line connecting the apex to a bottom point defined at a position located at the bottom of the groove and between the pair of end points. Forming such cutaway portions in the center rib improves both the on-ice performance and the wet performance because of the edge effect of the cutaway portions. In addition, the cutaway portions with the above-described construction can suppress the decrease in the rigidity of the center rib near the edges of the cutaway portions. Accordingly, the pneumatic tire can achieve an improvement both in the wear resistance and in the driving stability.

For the purpose of further improving both the on-ice performance and the wet performance, it is desirable that each cutaway portion has the following structure. It is preferable that, at each endpoint of each cutaway portion, the center rib should form an acute angle portion, and, on the ground-contacting surface, the acute angle portion of the center rib should have an angle α of 20° to 90°, and that, at the same time, at the apex of each cutaway portion, the cutaway portion should form an acute angle portion, and, on the ground-contacting surface, the acute angle portion of the cutaway portion should have an angle β of 20° to 90°. In addition, it is preferable that each cutaway portion should form, on the ground-contacting surface of the center rib, a second contour line that extends in the tire-width direction and a third contour line that extends in the tire circumferential direction; and that, at the same time, the second contour line should be shorter than the third contour line, and should have a length of 10% to 50% of the width of the center rib. Moreover, it is preferable that the angle γ of the second contour line of each cutaway portion with respect to the tire-width direction should be 0° to 60°. Moreover, it is preferable that, in each cutaway portion, a tire-circumferential-direction distance from the bottom point to one of the pair of end points that is closer to the apex should be 10% to 50% of a distance between the pair of end points.

Figure 1:
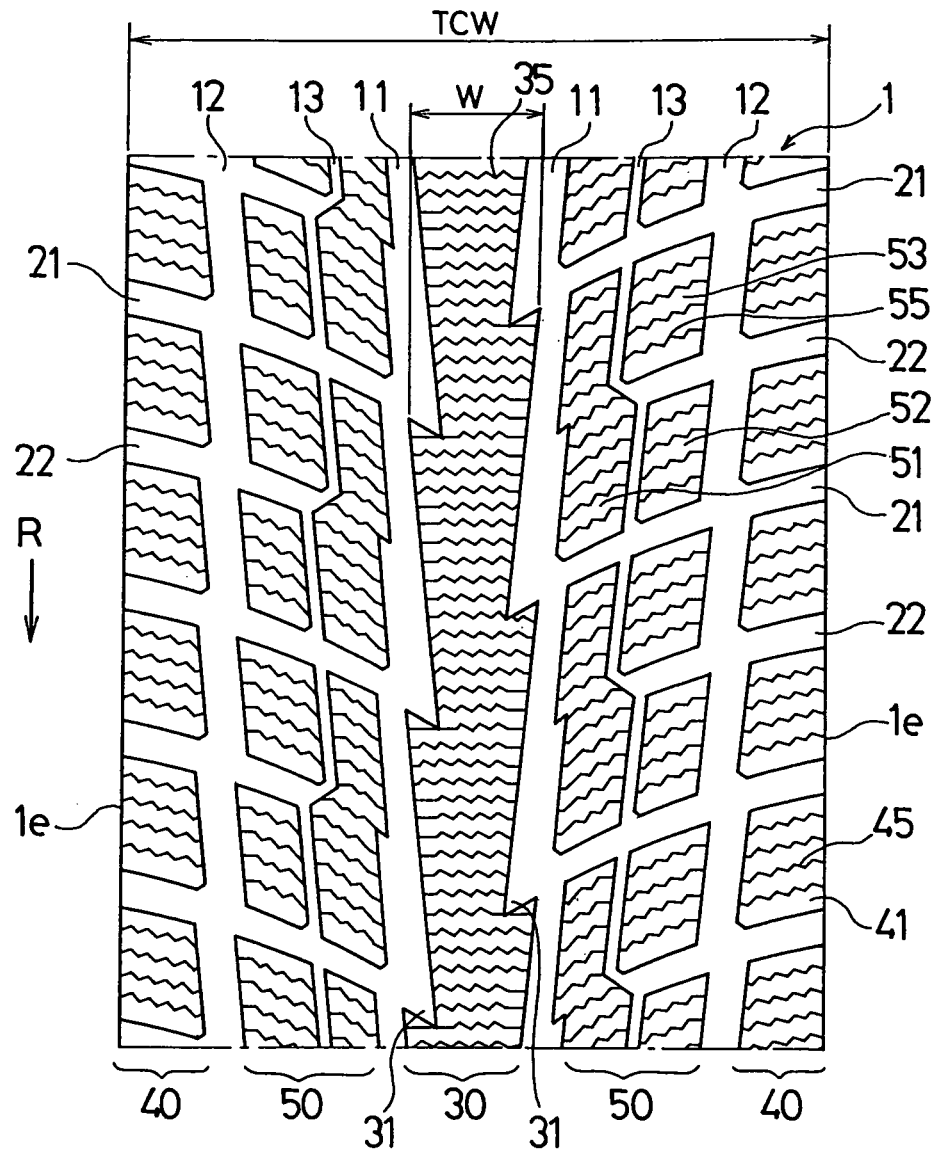
FIG. 1 is a development view illustrating a tread pattern of a pneumatic tire according to an embodiment of the invention.

| EXPLANATION OF REFERENCE NUMERALS | |
|---|---|
| 1 | tread |
| 11 | main groove (first main groove) |
| 12 | main groove (second main groove) |
| 21 | lug grooves (first lug grooves) |
| 22 | lug grooves (second lug grooves) |
| 30 | center rib |
| 31 | cutaway portions |
| 40 | shoulder block rows |
| 41 | blocks |
| 50 | intermediate block rows |
| 51 | long blocks |
| 52, 53 | blocks |
| 35, 45, 55 | sipes |

BEST MODES FOR CARRYING OUT THE INVENTION

Hereinafter, configurations of the invention will be described in detail by referring to the accompanying drawings. FIG. 1 is a view illustrating a tread pattern of a pneumatic tire according to an embodiment of the invention. Note that the tread pattern of FIG. 1 is a directional one, that is, the pneumatic tire has a designated rotating direction R.

As FIG. 1 shows, a pair of main grooves 11 and 11 (first main grooves) are formed in the center region of a tread 1 so as to extend in the tire circumferential direction. A pair of other main grooves 12 and 12 (second main grooves) are formed respectively outward of the corresponding main grooves 11 and 11. The main grooves 12 and 12 extend also in the tire circumferential direction. Each of these main grooves 11 and 12 may have either a straight-line shape or a zigzag shape. Between each main groove 11 and the corresponding main groove 12, a sub-main groove 13 is formed so as to extend also in the tire circumferential direction. The main grooves mentioned above are grooves each of which has a groove width of 5 mm to 20 mm measured at the surface of the tread and a groove depth of 7.9 mm to 12.5 mm. The sub-main grooves mentioned above are grooves each of which has a groove width of 1.5 mm to 15 mm measured at the surface of the tread and a groove depth of 7.9 mm to 12.5 mm. The groove width of each sub-main groove measured on the tread surface is narrower than the groove width of each main groove measured on the tread surface. The ratio of the groove width of each main groove to the groove width of each sub-main groove is 1.2 or larger.

Plural lug grooves 21 (first lug grooves) and plural lug grooves 22 (second lug grooves) are formed in the tread 1 so as to be arranged alternately in the tire circumferential direction. Each lug groove 21 extends from one of two shoulder ends 1e inwards in the tire-width direction and is communicatively connected to the corresponding main groove 11. Each lug groove 22 also extends from one of the two shoulder ends 1e inwards in the tire-width direction, but is not communicatively connected to the main grooves 11 and 11. Each of the lug grooves 21 and 22 inclines in the opposite direction to the rotating direction R of the tire toward the outside of the tread portion in the tire-width direction.

Accordingly, between the pair of main grooves 11 and 11, a center rib 30 is defined so as to extend continuously in the tire circumferential direction. Between each main groove 12 and the corresponding shoulder end 1e, a shoulder block row 40 is defined. Each shoulder block row 40 includes plural blocks 41. Between each main groove 11 and the corresponding main groove 12, an intermediate block row 50 is defined. Each intermediate block row 50 includes plural long blocks 51, plural blocks 52, and plural blocks 53. Each long block 51 included in each intermediate block row 50 has a circumferential-direction length equivalent to the total circumferential-direction length of each two blocks 41 and 41 included in each shoulder block row 40. To put it differently, the plural long blocks 51 are arranged at a pitch that is twice as long as the pitch for the plural blocks 41 included in each shoulder block row 40. The other two kinds of blocks 52 and 53 included in the intermediate block row are arranged at a pitch that is as long as the pitch for the plural blocks 41 included in each shoulder block row 40.

Plural sipes 35 are formed in the center rib 30. Plural sipes 45 are formed in each block 41 included in each shoulder block row 40. Plural sipes 55 are formed in each of the blocks 51, 52 and 53 included in each intermediate block row 50. Each of these sipes 35, 45, and 55 extends in the tire-width direction. Each of these sipes 35, 45, and 55 has a zigzag shape on the tread surface in FIG. 1, but the shape is not limited to a particular shape.

In the pneumatic tire with a tread pattern configured in the above-described manner, the center rib 30 is arranged in the center region of the tread 1, the shoulder block rows 40 and 40 are arranged respectively in the shoulder regions of the tread 1, and each intermediate block row 50 including long blocks 51 is arranged between the center rib 30 and the corresponding shoulder block row 40. Accordingly, the ratio of groove area increases gradually from the center region of the tread 1 to each shoulder end 1e. In the center region of the tread 1, the existence of the center rib 30 and of the long blocks 51 results in a large contact area, and thereby the pneumatic tire achieves an improvement in the on-ice performance. In addition, the lug grooves 21 are communicatively connected to the corresponding main groove 11 formed in the center region and result in a relatively large ratio of groove area in the shoulder regions. Accordingly, the pneumatic tire can secure sufficient drain function and thereby can achieve excellent wet performance. Consequently, the pneumatic tire can achieve both good on-ice performance and good wet performance.

In the above-described pneumatic tire, the ratio of groove area for the region within the tire-contact width TCW of tread 1 is set at 25% to 40%, and is preferably set at 28% to 35%. Accordingly, the pneumatic tire can achieve both good on-ice performance and good wet performance. If the ratio of groove area is lower than 25%, the wet performance is impaired. In contrast, if the ratio of groove area is higher than 40%, the on-ice performance is impaired.

The center rib 30 has a width W that is set at 5% to 25% of the tire-contact width TCW. Accordingly, the pneumatic tire can achieve both good on-ice performance and good wet performance. If the ratio of groove area is lower than 5%, the on-ice performance is impaired. In contrast, if the ratio of groove area is higher than 25%, the wet performance is impaired.

The plural sipes 35 are formed in the center rib 30. The plural sipes 45 are formed in each block 41 included in each shoulder block row 40. The plural sipes 55 are formed in each of the blocks 51, 52 and 53 included in each intermediate block row 50. Each of these sipes 35, 45, and 55 extends in the tire-width direction. The sipes 35 formed in the center rib 30 are arranged in the tire circumferential direction at smaller intervals than both the intervals at which the sipes 45 formed in each shoulder block row 40 are arranged in the tire circumferential direction and the intervals at which the sipes 55 formed in each intermediate block row 50 are arranged in the tire circumferential direction. In this way, the tire-circumferential-direction intervals for the sipes 35 formed in the center rib 30 are selected to be smaller ones than the corresponding intervals for the other two kinds of sipes 45 and 55. Accordingly, the pneumatic tire can achieve an improvement in the on-ice performance. Incidentally, if the tire-circumferential-direction intervals for the sipes 45 formed in each shoulder block row 40 or the tire-circumferential-direction intervals for the sipes 55 formed in each intermediate block row 50 are made smaller, the blocks in these block rows 40 or 50 are more likely to fall down at the time of braking or at the time of driving. Accordingly, the pneumatic tire cannot achieve a sufficient improvement in the on-ice performance. In contrast, even if the tire-circumferential-direction intervals for the sipes 35 formed in the center rib 30 are made smaller, such falling-down of the blocks is less likely to occur in the center rib 30. Accordingly, the pneumatic tire can enjoy the edge effect of the sipes 35 as much as possible.

Figure 2:
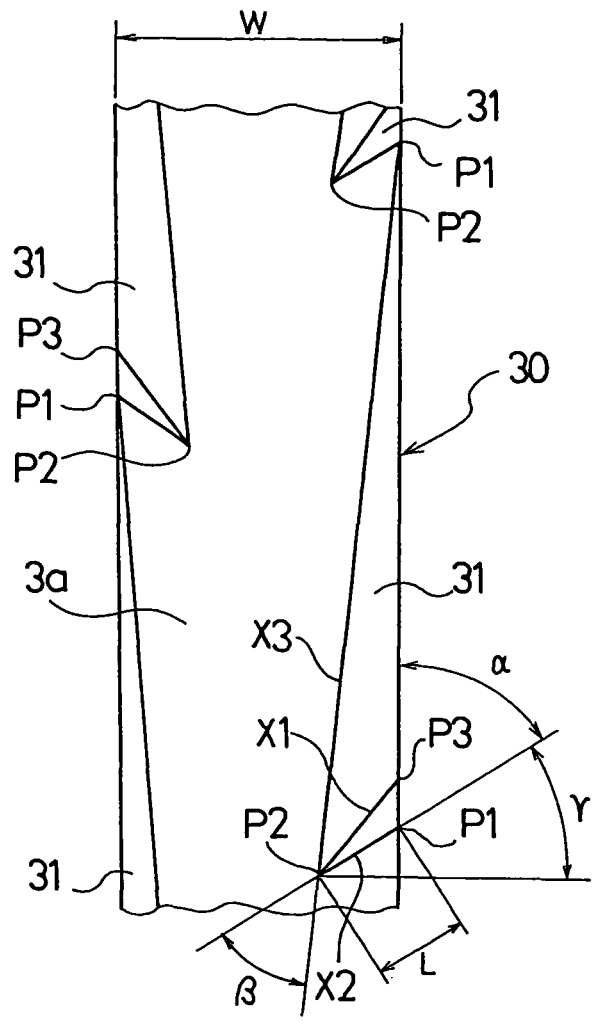
FIG. 2 is a top plan view illustrating, in an enlarged manner, a center rib shown in FIG. 1.
Figure 3:
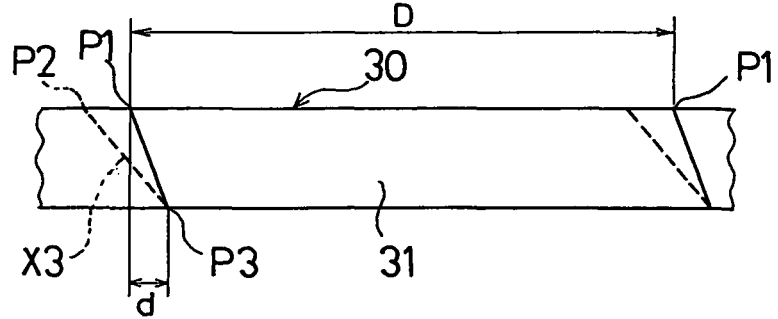
FIG. 3 is a side elevation view illustrating, in an enlarged manner, the center rib shown in FIG. 1.

FIG. 2 is a top plan view illustrating, in an enlarged manner, the center rib shown in FIG. 1. FIG. 3 is a side elevation view illustrating, in an enlarged manner, the center rib shown in FIG. 1. As FIGS. 2 and 3 show, plural cutaway portions 31 are formed in the center rib 30 so as to be arranged at certain intervals in the tire circumferential direction. Each cutaway portion 31 has a triangular shape formed in the tread surface of the center rib 30 and including an apex P2 and a pair of end points P1 and P1 all of which are connected to one another. Each cutaway portion 31 has a three-dimensional structure such that a valley line is formed by a contour line X1 (first contour line) connecting the apex P2 to a bottom point P3 defined at a position located at the bottom of the groove and between the pair of end points P1 and P1. On the tread surface of the center rib 30, the apex P2 is connected to one of the pair of end points P1 and P1 by another contour line X2 (second contour line) whereas the apex P2 is connected to the other one of the pair of end points P1 and P1 by still another contour line X3 (third contour line). Each of the contour lines X1, X2, and X3 of each cutaway portion 31 may be either a straight line or a curved line. At each end point P1 of each cutaway portion 31, the center rib 30 forms an acute angle portion, and the angle α of the acute angle portion on the tread surface preferably is 20° to 90°. At the apex P2 of each cutaway portion 31, the cutaway portion 31 forms an acute angle portion, and the angle β of the acute angle portion on the tread surface preferably is 20° to 90°.

Forming such cutaway portions 31 in the center rib 30 improves the on-ice performance and the wet performance of the pneumatic tire because of the edge effect of the cutaway portions 31. In addition, the cutaway portions 31 with the above-described construction can suppress the decrease in the rigidity of the center rib 30 near the edges of the cutaway portions 31. Accordingly, the pneumatic tire can achieve an improvement both in the wear resistance and in the driving stability.

On the tread surface of the center rib 30, each cutaway portion 31 forms the contour line X2 that extends in the tire-width direction and the contour line X3 that extends in the tire circumferential direction. The contour line X2 extending in the tire-width direction is shorter than the contour line X3 extending in the tire circumferential direction. The contour line X2 extending in the tire-width direction has a length L of 10% to 50% of the width W of the center rib 30. If the length L of the contour line X2 is shorter than 10% of the width W of the center rib 30, the edge effect of the cutaway portions 31 becomes insufficient. In contrast, if the length L of the contour line X2 is longer than 50% of the width W of the center rib 30, the contact area of the center rib 30 is decreased, so that the on-ice performance of the pneumatic tire is impaired. In addition, a preferable angle γ made by the contour line X2 with the tire-width direction is 0° to 60°. If this angle γ is larger than 60°, sufficient edge effect cannot be obtained at the time of braking by the vehicle running straight.

The bottom point P3 of each cutaway portion 31 is preferably defined at a position that is located away from one of the pair of end points P1 and P1 that is closer to the apex P2 by a distance of 10% to 50% of a distance D between the pair of end points P1 and P1. To put it differently, a distance d from the bottom point P3 to the above-mentioned one of the pair of end points P1 and P1 (i.e., the end point P1 that is closer to the apex P2) is defined to be 10% to 50% of the distance D between the pair of end points P1 and P1. If the bottom point P3 is too close to the apex P2, the wall of each cutaway portion 31 has such a steep sloping angle that the rigidity of the center rib 30 is decreased. In contrast, if the bottom point P3 is too far away from the apex P2, the edge effect of the cutaway portions 31 becomes so insufficient that the improvement in the on-ice performance is decreased.

The description of the embodiment given thus far is based on a case in which the plural cutaway portions 31 are formed in the center rib 30. The invention, however, includes a case in which no cutaway portion is formed in the center rib (see FIG. 4).

A preferable embodiment of the invention has been described in detail thus far, various modifications, substitutions, or replacements can be made without departing from the spirit and the scope of the invention defined by the accompanying claims.

EXAMPLES

Figure 4:
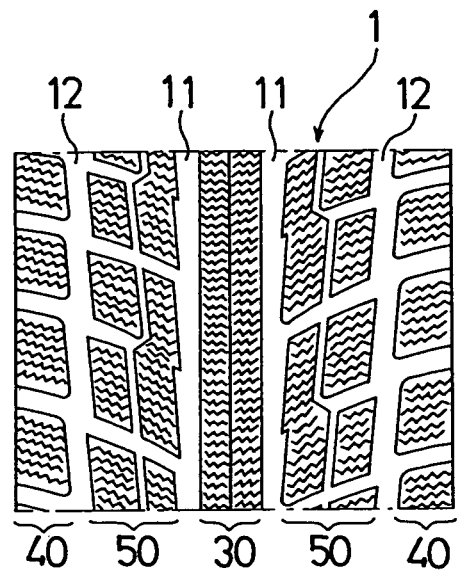
FIG. 4 is a development view illustrating a tread pattern of a pneumatic tire according to another embodiment of the invention.

A pneumatic tire having a tire size of 225/65R17 and a tread pattern illustrated in FIG. 1 (Example 1) and a pneumatic tire having the same tire size and a tread pattern illustrated in FIG. 4 (Example 2) were fabricated. A pneumatic tire having the same size and a tread pattern illustrated in FIG. 5 (Conventional Example) was fabricated for comparative purposes. In the pneumatic tire of Conventional Example, each long block formed in each intermediate block row has a tire-circumferential-direction length equivalent to each three of the blocks included in each shoulder block row.

An assessment using these tires was conducted by an assessment method given below on: the braking performance on ice; the braking performance on a wet road surface; and the drain performance on a wet road surface. Table 1 shows the assessment results.

Braking Performance on Ice

Each of the tested tires was fitted onto a wheel with a rim size of 17×7J and then the wheel with the test tire was mounted on a vehicle for testing. The tire was inflated with a pressure of 200 kPa. While the vehicle for testing was running on ice at a speed of 40 km/h, the brake was applied and the braking distance was measured. The assessment results shown in Table 1 are given by indices obtained using the reciprocals of the measured values and the indices of the assessment result for Conventional Example are normalized to 100. A larger index value for a tire means that the tire has better braking performance.

Braking Performance on Wet Road Surface

Each of the tested tires was fitted onto a wheel with a rim size of 17×7J and then the wheel with the test tire was mounted on a vehicle for testing. The tire was inflated with a pressure of 200 kPa. While the vehicle for testing was running on a wet road surface at a speed of 100 km/h, the brake was applied and the braking distance was measured. The assessment results shown in Table 1 are given by indices obtained using the reciprocals of the measured values and the indices of the assessment result for Conventional Example are normalized to 100. A larger index value for a tire means that the tire has better braking performance.

Drain Performance on Wet Road Surface

Each of the tested tires was fitted onto a wheel with a rim size of 17×7J and then the wheel with the test tire was mounted on a vehicle for testing. The tire was inflated with a pressure of 200 kPa. While the vehicle for testing was running on a wet road surface, the limit speed for causing the occurrence of hydroplaning phenomenon was measured. The assessment results shown in Table 1 are given by indices obtained using the measured values and the indices of the assessment result for Conventional Example are normalized to 100. A larger index value for a tire means that the tire has better drain performance.

TABLE 1

Figure 5:
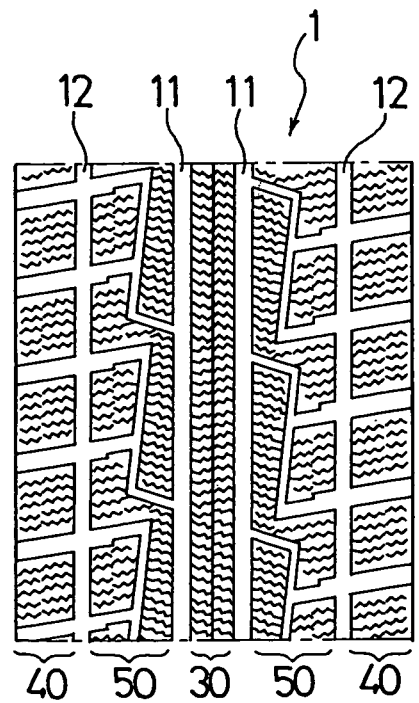
FIG. 5 is a development view illustrating a tread pattern of a conventional pneumatic tire.

| | Conventional Example | Example 1 | Example 2 |
|---|---|---|---|
| Tread Pattern | FIG. 5 | FIG. 1 | FIG. 4 |
| Braking Performance on Ice (index) | 100 | 105 | 100 |
| Braking Performance on Wet Road Surface (index) | 100 | 110 | 105 |
| Drain Performance on Wet Road Surface (index) | 100 | 105 | 105 |

As the Table 1 reveals, the tires of Examples 1 and 2 achieved an improvement both in the braking performance on a wet road surface and in the drain performance on a wet road surface in comparison to the tire of Conventional Example without sacrificing the braking performance on ice.

What is claimed is:

1. A pneumatic tire comprising:
   a pair of first main grooves which are formed in the center region of a tread and extend in the tire circumferential direction;
   a pair of second main grooves which are formed respectively outward of the corresponding first main grooves and extend in the tire circumferential direction;
   a plurality of first lug grooves and a plurality of second lug grooves which are alternately arranged in the tire circumferential direction, the first lug grooves each extending from one of two shoulder ends of the tread inward in the tire-width direction and communicating with the corresponding first main groove, the second lug grooves each extending from one of the two shoulder ends of the tread inward in the tire-width direction but not communicating with the corresponding first main groove;
   a center rib which is defined between the pair of first main grooves and which extends continuously in the tire circumferential direction;
   a shoulder block row which is defined between each of the second main grooves and a corresponding one of the shoulder ends and includes a plurality of blocks; and
   an intermediate block row which is defined between each of the first main grooves and a corresponding one of the second main grooves and includes a plurality of blocks, the pneumatic tire characterized in that:
   each intermediate block row includes long blocks each of which has a tire-circumferential-direction length equivalent to the total length of each two blocks included in the corresponding shoulder block row;
   a plurality of cutaway portions are formed in the center rib at certain intervals in the tire circumferential direction,
   each cutaway portion has a triangular shape formed on a ground-contacting surface of the center rib and having an apex and a pair of end points all of which are connected to one another, and
   each cutaway portion has a three-dimensional structure such that a valley line is formed by a first contour line connecting the apex to a bottom point defined at a position located at the bottom of the groove and between the pair of end points.

2. The pneumatic tire according to claim 1 characterized in that each intermediate block row includes:
   the plurality of long blocks each of which has a tire-circumferential-direction length equivalent to the total length of each two blocks included in the corresponding shoulder block row; and blocks which are arranged at the same pitch as the pitch for the plurality of blocks included in the corresponding shoulder block row.

3. The pneumatic tire according to claim 1 characterized in that the tread has a ratio of groove area of 25% to 40%, within a tire contact width.

4. The pneumatic tire according to claim 1 characterized in that the center rib has a width of 5% to 25% of the tire contact width.

5. The pneumatic tire according to claim 1 characterized in that a plurality of sipes each of which extends in the tire-width direction are formed in the center rib, in each block of the intermediate block rows, and in each block of the shoulder block rows, and the plurality of sipes formed in the center rib are arranged in the tire circumferential direction at smaller intervals than the intervals at which the sipes formed in any of the intermediate block rows and the shoulder block rows are arranged in the tire circumferential direction.

6. The pneumatic tire according to claim 1 characterized in that at each end point of each cutaway portion, the center rib forms an acute angle portion, and, on the ground-contacting surface, the acute angle portion of the center rib has an angle $\alpha$ of 20° to 90°, and at the apex of each cutaway portion, the cutaway portion forms an acute angle portion, and, on the ground-contacting surface, the acute angle portion of the cutaway portion has an angle $\beta$ of 20° to 90°.

7. The pneumatic tire according to claim 6 characterized in that each cutaway portion forms, on the ground-contacting surface of the center rib, a second contour line that extends in the tire-width direction and a third contour line that extends in the tire circumferential direction, and the second contour line is shorter than the third contour line, and has a length of 10% to 50% of the width of the center rib.

8. The pneumatic tire according to claim 7 characterized in that the angle $\gamma$ of the second contour line of each cutaway portion with respect to the tire-width direction is 0° to 60°.

9. The pneumatic tire according to claim 1 characterized in that, in each cutaway portion, a tire-circumferential-direction distance from the bottom point to one of the pair of end points that is closer to the apex is 10% to 50% of a distance between the pair of end points.

\* \* \* \* \*